March 18, 1924.  1,487,440
A. J. BUTTS
FISHING TOOL
Filed April 17, 1922
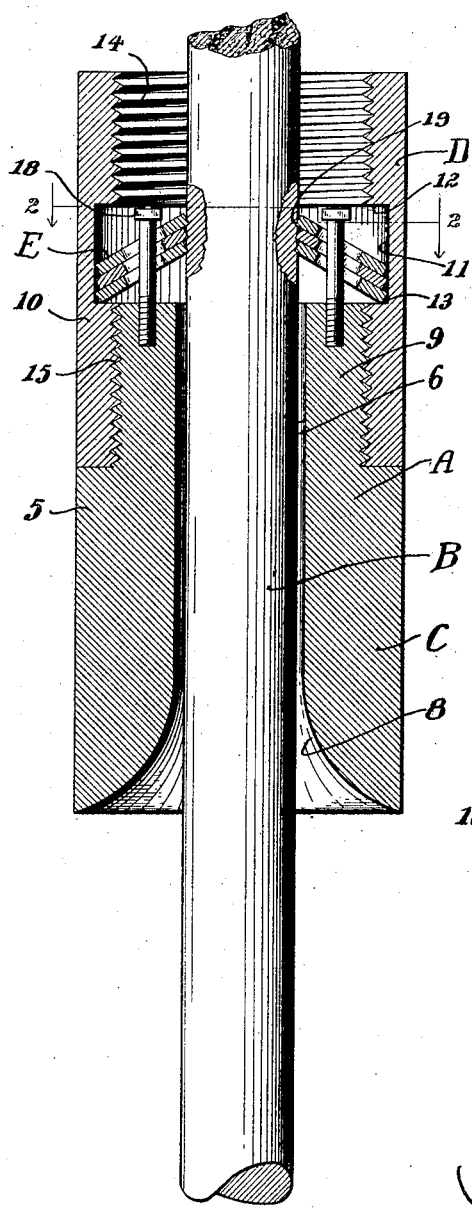
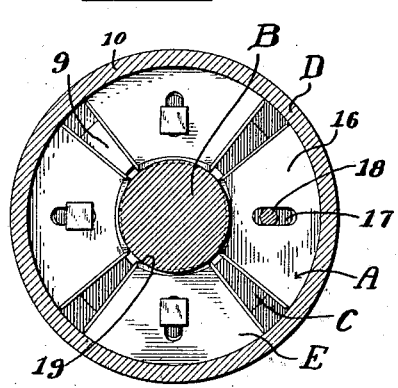
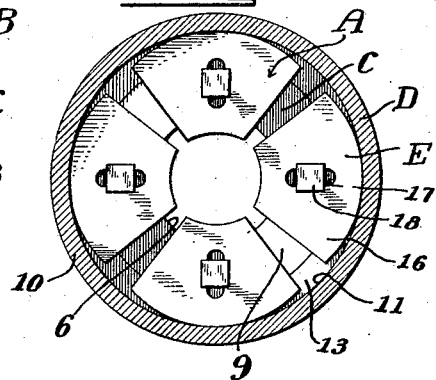
Inventor
Alden J. Butts.
By Lancaster and Allwine
Attorneys Patented Mar. 18, 1924.

1,487,440

UNITED STATES PATENT OFFICE.

ALDEN J. BUTTS, OF EATON RAPIDS, MICHIGAN.

FISHING TOOL.

Application filed April 17, 1922. Serial No. 553,311.

*To all whom it may concern:*

Be it known that I, ALDEN J. BUTTS, a citizen of the United States, residing at Eaton Rapids, in the county of Eaton and State of Michigan, have invented certain new and useful Improvements in Fishing Tools, of which the following is a specification.

This invention relates to fishing tools, and the primary object of the invention is to provide an improved tool for the recovery of rods, pipes and the like lost in mine and well shafts, the tool embodying a novel means for engaging the rod, pipe or the like, and novel means for firmly gripping the rod or pipe upon the raising movement of the tool.

Another object of the invention is to provide a fishing tool embodying a guide section for leading the pipe or rod into the tool, and a gripping section carried by the guiding section for engaging the pipe or rod being recovered.

A further object of the invention is to provide novel gripping elements for engaging the pipe or rod to be recovered, and novel means for arranging the gripping elements within the gripping section of the fishing tool.

A still further object of the invention is to provide a novel fishing tool of the above character, which will be durable and efficient in use, one that will be simple and easy to manufacture, and one which can be placed upon the market at a reasonable cost.

With these and other objects in view, the invention consists in the novel construction, arrangement and formation of parts, as will be hereinafter more specifically described, claimed and illustrated in the accompanying drawings, forming a part of the specification, in which drawings:

Figure 1 is a central vertical section through the improved fishing tool, showing the same in gripping position on a rod to be raised.

Figure 2 is a horizontal section through the tool taken on the line 2—2 of Figure 1, showing the trap or gripping dogs in gripping position with the rod.

Figure 3 is a similar section, showing the gripping or trap dogs in non-gripping position.

Referring to the drawings in detail, wherein similar reference characters designate corresponding parts throughout the several views, the letter A generally indicates the improved fishing tool and B the device being recovered.

In this instance, the device being recovered has been shown to be in the nature of a rod, but it is to be understood, of course, that the tool can be used for recovering other devices, such as drills, pipes and the like.

The improved fishing tool A comprises a lower guide section C, and an upper gripping section D.

The lower guide section C includes a cylindrical body 5 having an axial bore 6 extending longitudinally therethrough. The extreme lower end of the bore 6 is flared to provide a funnel shaped guide opening 8 which facilitates the entrance of the rod or other device B being recovered, into the tool. The upper end of the cylindrical body 5 is provided with a reduced externally threaded connecting stud 9 for permitting the connection of the gripping section D therewith.

The upper gripping section D comprises a hollow cylindrical body 10 having an annular groove 11 formed in the inner surface thereof, at a point substantially equi-distant of its terminals.

This annular groove 11 defines a chamber for receiving the gripping device E which will be hereinafter more fully described. It can be seen that this groove 11 defines upper and lower shoulders 12 and 13. The cylindrical body 10 is provided with upper and lower sets of internal threads 14 and 15, and the lower threads 15 are adapted to receive the externally threaded reduced stub 9 formed on the lower guiding section C. When the guiding section C is connected with the gripping section D, it can be seen that the upper surface of the stud is flush with the lower shoulder 13 defined by the annular groove 11. The upper set of internal threads 14 is of course adapted to receive the means utilized for lowering the fishing tool within the well or mine shaft.

The gripping means E includes a plurality of sector shaped trap or gripping dogs 16, and these dogs 16 are disposed in annular relation within the chamber defined by the groove 11. Any number of these dogs 16 may be utilized, and if desired, a plurality of dogs may be arranged in superposed relation as clearly shown in Figure 1 of the drawings. The number of dogs or sets of dogs utilized can be contingent on the character of the device being recovered, and any number of sets of dogs can be disposed within the chamber as may be desired. As shown in the drawings, three superposed sets of dogs have been utilized. Each of the dogs 16 is provided with a radially extending slot 17, which is adapted to receive the shank of a guide pin 18. These guide pins 18 are threaded into the upper end of the stud 9 and provide means for guiding the raising and lowering of the dogs. These dogs are so shaped that when the same are arranged in a canted position, as shown in Figure 1 of the drawings, the lower edges of the same will provide biting teeth 19 for frictionally engaging the outer surface of the device being recovered.

In use of the improved fishing tool, the same is lowered within the well or mine shaft, and the funnel shaped opening 8 will tend to guide the device, being recovered into the bore 6. As the device being recovered rides into the bore, the same will push up the trap or gripping dogs 16, and when the tool is raised, the lower inner edges 19 of the dogs will be forced into intimate gripping contact with the device being recovered, and thus permit the raising thereof.

In the dismantling of the improved fishing tool, the guide pins 18 can be removed prior to the taking apart of the sections C and D. These pins can be conveniently removed by inserting a tool within the upper end of the upper section D.

From the foregoing description, it can be seen that an efficient and simple tool has been provided for recovering well rods, pipes and the like, in which a firm grip will be had upon the rods, when the same enter into the bore of the tool.

Changes in details may be made without departing from the spirit or scope of the invention; but,

I claim:

1. A fishing tool comprising a lower guide section having a longitudinally extending bore for receiving the device to be recovered, an upper gripping section carried by the guiding section and having a chamber intermediate its length, the chamber being open at its upper end, dogs disposed within the chamber of the gripping section for engaging the device to be recovered, and guide means for said dogs carried by the upper end of the guide section and extending into said chamber and engaging said dogs, said guide means being insertable and removable through the open upper end of the chamber.

2. A fishing tool comprising a lower guiding section, an upper gripping section removably associated with the guiding section, the guiding section having an axially disposed longitudinal bore therein, said gripping section having an annular chamber formed therein with the upper end of the guiding section forming a portion of the bottom of the chamber, a plurality of gripping dogs disposed in said chamber and arranged to normally overlie the bore of the guide section, and pins carried by the upper end of said guiding section and passing through openings in the dogs to guide movement of the dogs.

3. A fishing tool comprising a guide section having a longitudinally extending bore therethrough, an externally threaded attaching stud carried by the upper end of the guide section, a hollow cylindrical upper gripping section having an annular chamber formed therein, the inner surface of the gripping section being threaded for the reception of said stud, guide pins carried by the stud and extending into the chamber formed in the gripping section, and a plurality of superposed dogs mounted in annular relation in said chamber and arranged to normally overlie the bore in the guide section, the dogs having radially extending guide ways formed therein to receive said guide pins.

4. As a new article of manufacture, a fishing tool comprising a cylindrical guide section having an axially disposed bore therein, an externally threaded reduced attaching stud carried by the upper end of the section, a hollow cylindrical gripping section provided with internal threads for receiving the stud, the body having an internal annular groove formed therein intermediate its ends defining a lower shoulder, a plurality of gripping dogs of sector shape arranged in annular formation in said groove and arranged to overlie the bore, the inner arcuate edges of said dogs being provided with biting edges, the outer edges of the dogs being adapted to rest upon the lower shoulder defined by said groove, and a plurality of said upstanding headed guide pins carried by the upper end of said guide section, radially extending guide slots being formed in the dogs and arranged to receive said guide pins.

ALDEN J. BUTTS.